United States Patent
Kinjo et al.

(10) Patent No.: US 12,039,527 B2
(45) Date of Patent: Jul. 16, 2024

(54) SERVICE PROVIDING SYSTEM, SERVICE PROVIDING DEVICE, SERVICE PROVIDING METHOD, AND SERVICE PROVIDING PROGRAM

(71) Applicant: NIPPON TELEGRAPH AND TELEPHONE CORPORATION, Tokyo (JP)

(72) Inventors: Koha Kinjo, Tokyo (JP); Ryohei Suzuki, Tokyo (JP); Tetsuya Okuda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/292,395

(22) PCT Filed: Dec. 25, 2019

(86) PCT No.: PCT/JP2019/050989
§ 371 (c)(1),
(2) Date: May 7, 2021

(87) PCT Pub. No.: WO2020/145163
PCT Pub. Date: Jul. 16, 2020

(65) Prior Publication Data
US 2022/0012730 A1 Jan. 13, 2022

(30) Foreign Application Priority Data
Jan. 11, 2019 (JP) .................. 2019-003622

(51) Int. Cl.
*G06Q 20/38* (2012.01)
*G06Q 20/40* (2012.01)

(52) U.S. Cl.
CPC ....... *G06Q 20/3825* (2013.01); *G06Q 20/401* (2013.01)

(58) Field of Classification Search
CPC .................. G06Q 20/3825; G06Q 20/401
(Continued)

(56) References Cited

U.S. PATENT DOCUMENTS 6,957,334 B1 * 10/2005 Goldstein .............. G06Q 20/02
713/180
7,979,353 B2 7/2011 Akama
(Continued)

FOREIGN PATENT DOCUMENTS

WO 2002/099710 A1 12/2002
WO 2018/154793 A1 8/2018

OTHER PUBLICATIONS

TechTarget Contributor, WhatIs.com, "Definition document," dated 2005 https://whatis.techtarget.com/definition/document (Year: 2005).*
(Continued)

*Primary Examiner* — Scott C Anderson
*Assistant Examiner* — George N. Proios

(57) ABSTRACT

A service providing system providing services to a plurality of users includes a transmitting unit configured to transmit, to a user terminal of each user, an authentication request requesting authentication for executing a predetermined process, a receiving unit configured to receive, from the user terminal of each user, an authentication response affixed with a user signature, and an executing unit configured to execute the predetermined process with respect to each user upon successful signature verification for all the plurality of users.

10 Claims, 12 Drawing Sheets

(58) Field of Classification Search
USPC ........................................................... 705/44
See application file for complete search history.

(56) References Cited

U.S. PATENT DOCUMENTS

| | | | | |
|---|---|---|---|---|
| 2006/0277123 | A1* | 12/2006 | Kennedy | G06Q 20/401 |
| | | | | 705/35 |
| 2011/0213857 | A1* | 9/2011 | Philipeit | G06F 9/455 |
| | | | | 709/224 |
| 2013/0148024 | A1* | 6/2013 | Shin | H04N 21/42204 |
| | | | | 705/44 |
| 2015/0254659 | A1* | 9/2015 | Kulkarni | G06Q 20/325 |
| | | | | 705/44 |
| 2017/0213200 | A1* | 7/2017 | Purves | G06Q 20/227 |
| 2018/0174227 | A1* | 6/2018 | Pham | G06Q 20/204 |
| 2018/0232735 | A1* | 8/2018 | Palacio | G06Q 20/401 |
| 2018/0260679 | A1* | 9/2018 | Edwards | G06Q 20/3567 |
| 2018/0267847 | A1* | 9/2018 | Smith | G06F 16/9577 |

OTHER PUBLICATIONS

Open Banking, "Open Banking Guidelines for Read/Write Participants" dated May 2018, https://www.openbanking.org.uk/wp-content/uploads/Guidelines-for-Read-Write-Participants.pdf (Year: 2018).*
Oauth, "Access Tokens," dated Sep. 8, 2018, https://web.archive.org/web/20180908015408/https://www.oauth.com/oauth2-servers/access-tokens/ (Year: 2018).*
D. Hardt (2012) "The OAuth 2.0 Authorization Framework," Microsoft, Oct. 2012 [online] website: https://tools.ietf.org/html/rfc6749.

* cited by examiner

SERVICE PROVIDING SYSTEM, SERVICE PROVIDING DEVICE, SERVICE PROVIDING METHOD, AND SERVICE PROVIDING PROGRAM

CROSS-REFERENCE TO RELATED APPLICATIONS

This application is a U.S. 371 Application of International Patent Application No. PCT/JP2019/050989, filed on 25 Dec. 2019, which application claims priority to and the benefit of JP Application No. 2019-003622, filed on 11 Jan. 2019, the disclosures of which are hereby incorporated herein by reference in their entireties.

TECHNICAL FIELD

The present invention relates to a service providing system that provides services to a plurality of users.

BACKGROUND ART

In recent years, Fintech has been attracting attention. In particular, in order to open up write access to financial institutions, an open API is being promoted and the standard specification 'OAuth' (see Non-patent Literature 1) for access authorization is formulated. OAuth is an open standard for authorization and specifies a broad protocol with a view to the widely used standards.

Currently, in write access in financial transactions, the bank directly requires users to authenticate the transaction after authorization is processed by OAuth. Furthermore, with regard to the write access, there is a consideration regarding a hijacking of user terminals and financial service providers, so a solution through two-factor authentication is suggested.

Additionally, there is a possibility that transactions contributed by a large number of people, such as crowdfunding and bill splitting apps, will be conducted through financial service providers in the future.

CITATION LIST

Non-Patent Literature

[Non-Patent Literature 1] [RFC6749] Hardt, D., Ed., "The OAuth 2.0 Authorization Framework", RFC 6749, DOI 10.17487/RFC6749, October 2012.

SUMMARY OF INVENTION

Technical Problem

As was previously described, a transaction authentication according to OAuth authorization protocol (a protocol to which an authorizer is involved) requires financial institutions (banks, etc.) to perform a write access confirmation to users as a final confirmation.

However, in a transaction authentication contributed by a large number of people, when a write access confirmation such as that described above is performed, the inseparability of the entire series of the transaction process is lost if the authentication result is different for each individual. It is necessary to inform the bank without falsification, in a state where the authentication result is in the same state as everyone else. However, there is no means to achieve this with conventional techniques. These problems, not being limited to financial services, can occur in other fields as well.

The present invention has been made from the above perspective, and has an object to provide a technology capable of executing a process only when the authentication results of all the plurality of users match with regard to providing a service to the plurality of users.

Solution to Problem

According to a technology of the present disclosure, a service providing system providing services to a plurality of users includes a transmitting unit configured to transmit, to a user terminal of each user, an authentication request requesting authentication for executing a predetermined process, a receiving unit configured to receive, from the user terminal of each user, an authentication response affixed with a user signature, and an executing unit configured to execute the predetermined process with respect to each user upon successful signature verification for all the plurality of users.

Advantageous Effects of Invention

According to the technology of the present disclosure, a technique is provided that is capable of executing a process only when authentication results of all the plurality of users match with regard to providing a service to the plurality of users.

DESCRIPTION OF EMBODIMENTS

Hereinafter, embodiments according to the present invention will be described with reference to the drawings. The embodiments described below are merely examples, and the embodiments to which the present invention is applied are not limited to the following embodiments.

For example, as described below, a process based on OAuth is described in the present embodiment, but the present invention may also be applied to a method that does not use OAuth. Furthermore, in the present embodiment, an example of applying the present invention to a financial service is described as an example, but the present invention is not limited to the financial service and may be applied to various fields of services that are provided to a plurality of users. Furthermore, "authentication" described below may be replaced with "approval."

Outline of Process with OAuth

Since OAuth is used in the present embodiment, as an outline of a process using OAuth, first, a process (conventional technology) will be explained in which a bank requests a user to confirm the write access (sign) after authorization by OAuth, with reference to FIG. 1.

OAuth 2.0 (hereinafter referred to as OAuth) disclosed in Non-Patent Literature 1 assumes four types of roles including a resource owner, a client, a resource server, and an authorization server. In financial services assumed in the present embodiment, a resource owner corresponds to a user of financial services, a client corresponds to a financial service provider, and a resource server and an authorization server both correspond to a bank (or other financial institutions).

Figure 1:
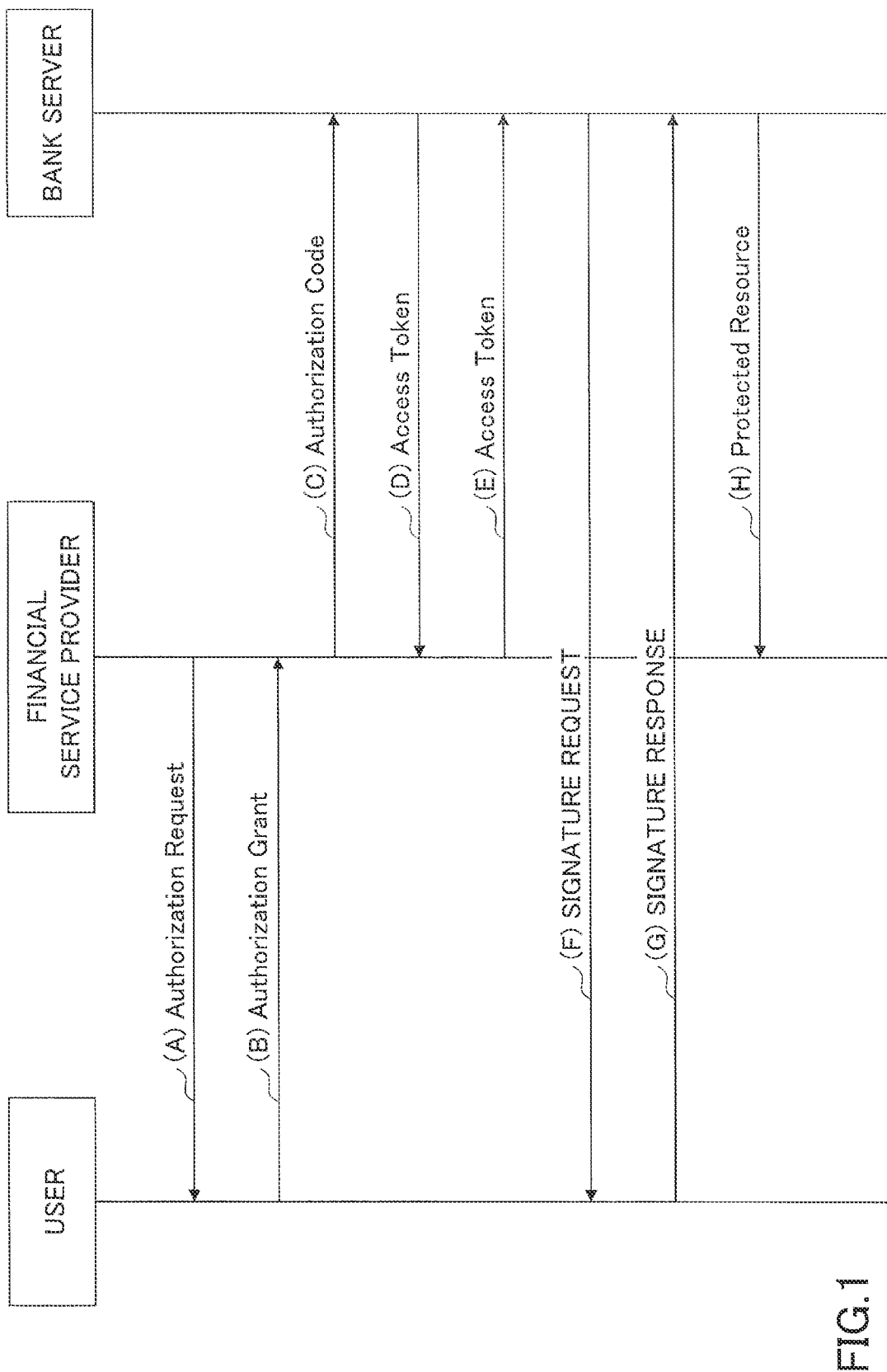
FIG. 1 is a diagram for explaining a conventional flow of process using OAuth.

In FIG. 1, each step of the sequence is identified by the letters in parentheses. For example, (A) is Step A. The same applies to each sequence diagram described hereinafter. Furthermore, in the example of FIG. 1, the bank server includes a function of a resource server and a function of an authorization server.

In Step A of FIG. 1, a financial service provider transmits Authorization Request to a user. Authorization Request is a message for confirmation by the resource owner that the client is allowed to access the resource server.

In Step B, the user transmits Authorization Grant to the financial service provider, and in Step C, the financial service provider transmits Authorization Code to the bank server.

In Step D, the bank server transmits Access Token to the financial service provider, and in Step E, the financial service provider accesses the resource server using Access Token and requests to perform the required process (e.g., withdrawal from an account) in the financial service.

In Step F, the bank server sends Signature Request to the user, and in Step C, the user transmits the signed document to the bank server as Signature Response. By verifying the signature, the bank server confirms that the user's write access confirmation (authentication that user's resources (account, and the like) are written) has been obtained, and executes the required process. In Step H, Protected Resource (a report that a process has been executed) is transmitted to the financial service provider.

In a financial service involving a plurality of people such as bill splitting apps, which is assumed in the present embodiment, a service cannot be completed unless authentication results of all the plurality of people are OK. Therefore, it is required to confirm the authentication results of all the plurality of people. However, in conventional technology as was previously described, it is only possible to confirm the authentication result for each user, and it is not possible to perform the process after confirming whether or not the authentication results of all the plurality of people are OK.

Outline of Embodiment

In order to solve the above problem, in the present embodiment, a financial service provider who knows the transactions of all members is set as an endpoint of communication, and the financial service provider confirms the authentication results of all the members. Furthermore, the financial service provider may sign to clarify that the financial service provider is responsible for the entire transaction.

Figure 2:
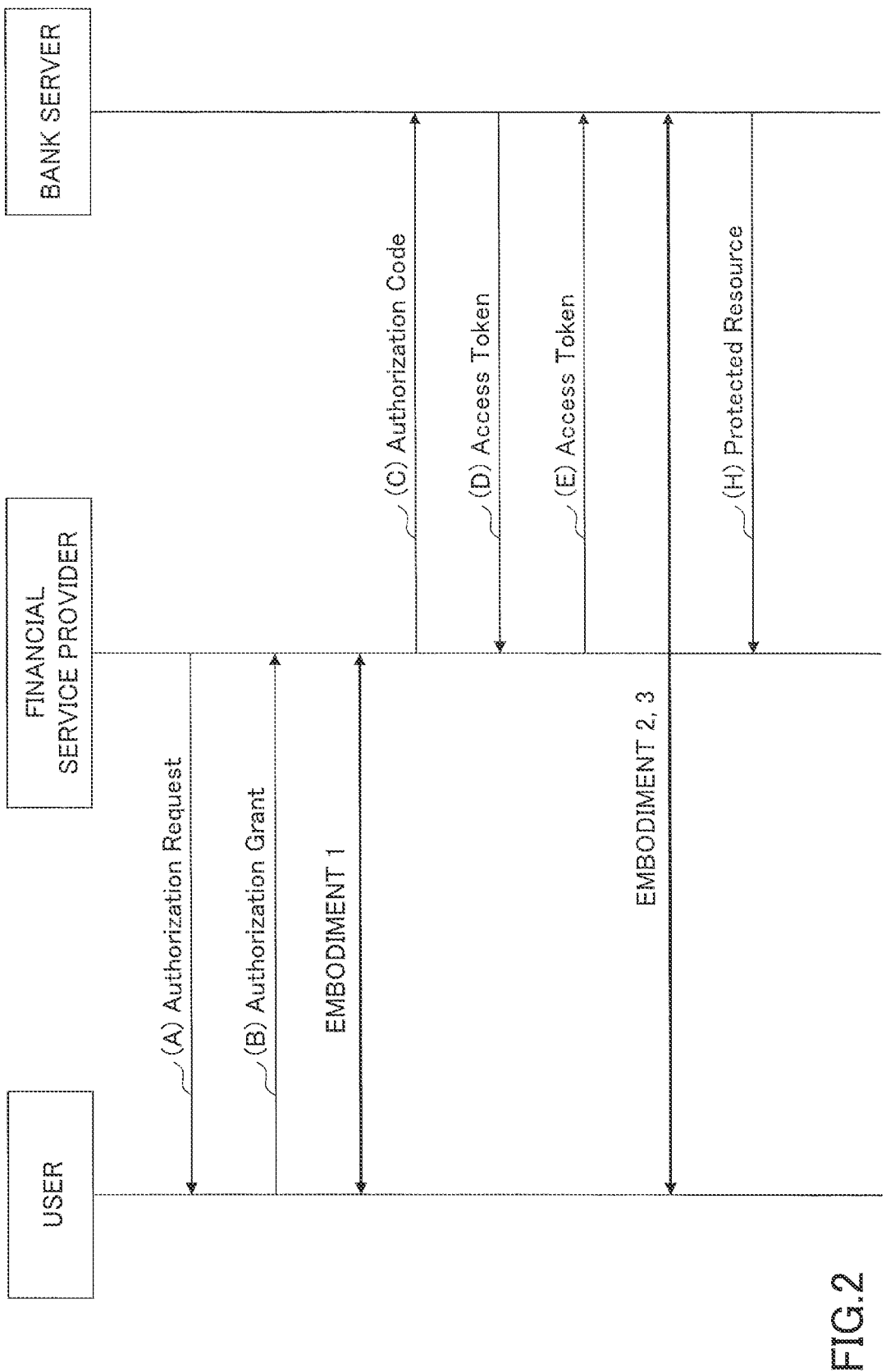
FIG. 2 is a diagram for explaining an outline of an embodiment of the present invention.

Embodiment 1 (Embodiments 1-1 to 1-3 specifically), Embodiment 2, Embodiment 3, and Embodiment 4 are examples of a process to realize the above. Sequences of these embodiments are located partway in OAuth protocol as shown in FIG. 2. The detailed sequences of Embodiments 1 to 4 will be described later.

System/Device Configuration

Figure 3:
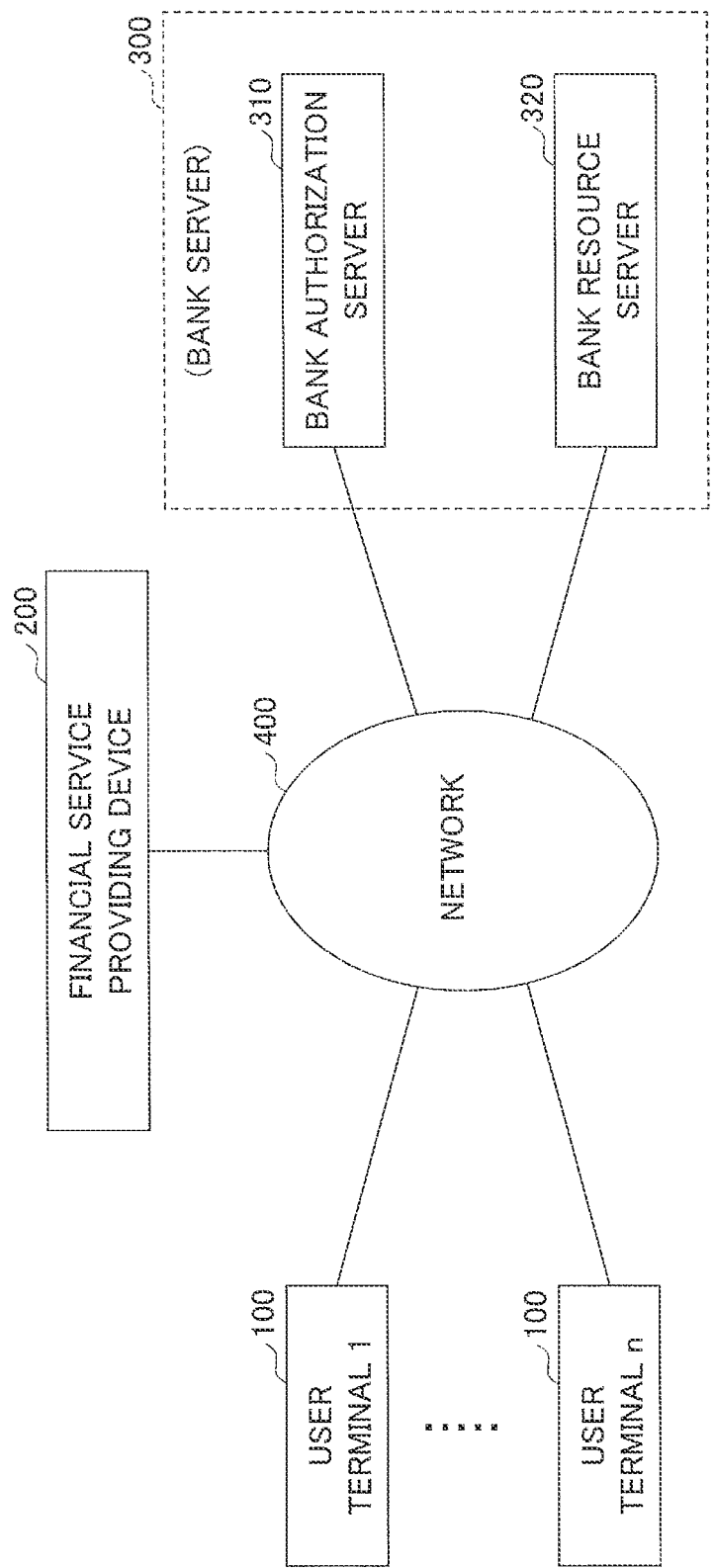
FIG. 3 is a diagram illustrating a configuration of a system according to an embodiment of the present invention.

FIG. 3 illustrates an overall configuration diagram of the financial service providing system according to the present embodiment. As shown in FIG. 3, the present system includes n user terminals 100 (1 to n), a financial service providing device 200, a bank authorization server 310, and a bank resource server 320, and these devices are connected to a network 400. Furthermore, as described in Embodiment 4, a transaction authentication server 330 may be connected to the network 400.

Instead of keeping the bank authorization server 310 and the bank resource server 320 separated, a bank server 300 including the function of the bank authorization server 310 and the function of the bank resource server 320 may be provided. Furthermore, the bank authorization server 310, the bank resource server 320, and the bank server 300 may be different for each user. In other words, a plurality of the bank authorization server 310, a plurality of the bank resource server 320, and a plurality of the bank server 300 may be provided.

The user terminals 100, the financial service providing device 200, a set of the bank authorization server 310 and the bank resource server 320 (or the bank server 300) shown in FIG. 3 respectively correspond to the users, the financial service provider, and the bank server shown in FIGS. 1 and 2.

A plurality of n user terminals 100 correspond to terminals of a plurality of people (n people) who use a financial service that involves the plurality of people assumed in the present embodiment. In other words, in the present embodiment, the fact that all the members are authenticated (authentication OK) means that the verification results of the signatures sent from all n user terminals 100 are OK. Each user terminal 100 is, for example, a PC, a smartphone, a tablet, or the like.

Note that the configuration shown in FIG. 3 is merely an example. For example, a device on the bank side (the bank authorization server 310, the bank resource server 320, the bank server 300, or the like) may be provided with all or part of the functions (confirmation function of authentication of all members, etc.) of the financial service providing device 200. On the contrary, all or part of the functions (for example, executing function of transaction process (predetermined process)) of a device on the bank side (the bank authorization server 310, the bank resource server 320, the bank server 300, etc.) may be provided in the financial service providing device 200. Furthermore, each device may be provided with an externally separate device for a function of verifying the signature. Furthermore, the financial service providing device 200 may be provided with an externally separate device for the function of verifying the authentication of all members. Furthermore, either a configuration including the bank authorization server 310 and the bank resource server 320, or the bank server 300 may be referred to as a "system."

Figure 4:
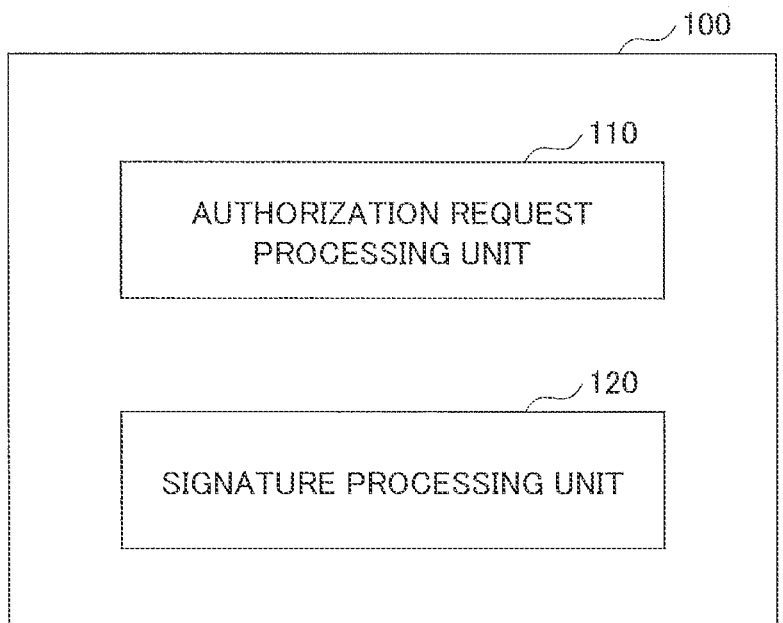
FIG. 4 is a configuration diagram of a user terminal 100.
Figure 5:
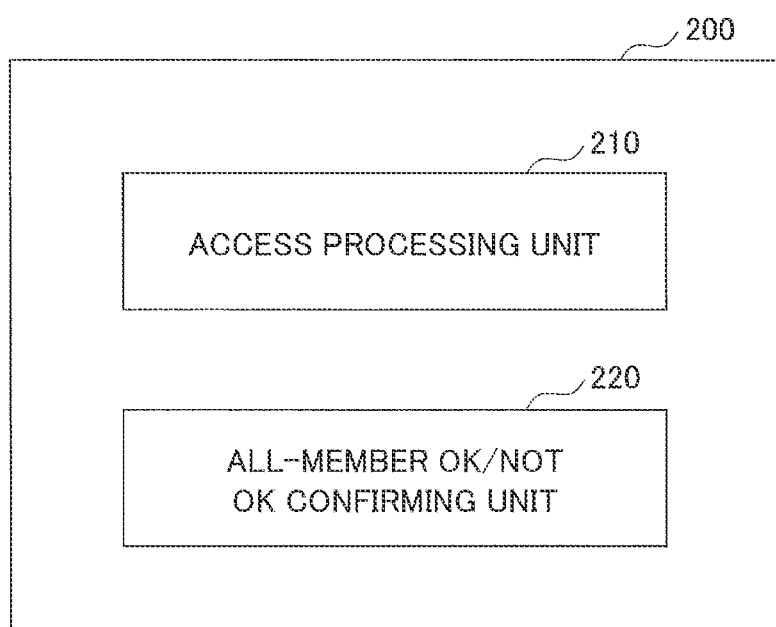
FIG. 5 is a configuration diagram of a financial service providing device 200.
Figure 6:
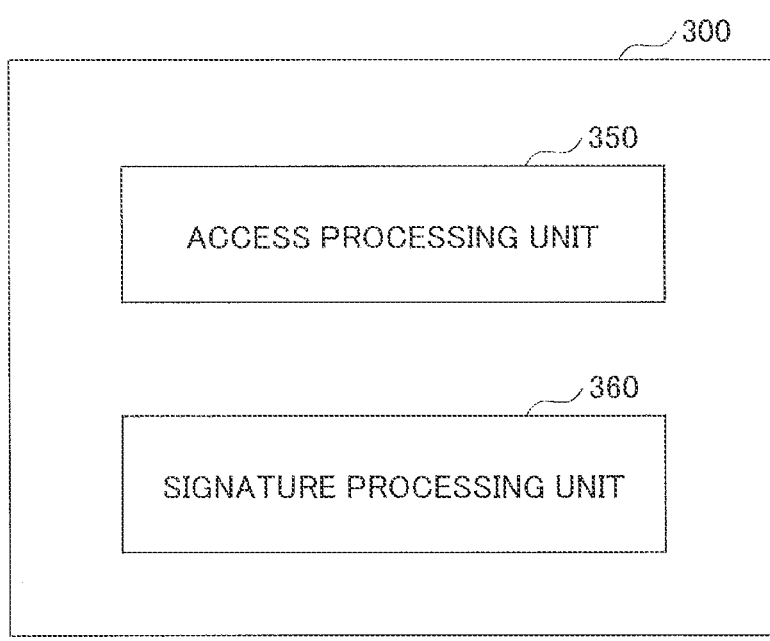
FIG. 6 is a configuration diagram of a bank server 300.

FIG. 4 is a configuration diagram of the user terminal 100. As shown in FIG. 4, the user terminal 100 includes an authorization request processing unit 110 and a signature processing unit 120. FIG. 5 is a configuration diagram of the financial service providing device 200. As shown in FIG. 5, the financial service providing device 200 includes an access processing unit 210 and an all-member OK/NOT OK confirming unit 220. FIG. 6 is a configuration diagram of the bank server 300. As shown in FIG. 6, the bank server 300 includes an access processing unit 350 and a signature processing unit 360.

An operation of each functional unit (and the bank authorization server 310, the bank resource server 320) will be described later by using these functional units (and the bank authorization server 310, the bank resource server 320) in the description of each embodiment.

Furthermore, depending on the embodiment, some functional units are not used. In each embodiment, unused functional units may or may not be provided in the corresponding device.

Hardware Configuration Example

Each device of the present embodiment (the user terminal 100, the financial service providing device 200, the bank server 300, the bank authorization server 310, the bank resource server 320, the transaction authentication server 330, and the like) can be realized by, for example, making a computer execute a program that stores the contents of processing described in the present embodiment. Furthermore, a "computer" may be a virtual machine provided by cloud service. When using a virtual machine, the "hardware" of the present disclosure refers to virtual hardware.

A hardware resource such as a CPU (Central Processing Unit) and a memory built in a computer is used to realize the device by executing a program corresponding to a process executed in the device. The program can be recorded on a computer-readable storage medium (a portable memory, etc.), and then distributed and/or saved. Furthermore, the program may be provided through a network such as Internet or electronic mail. Note that the CPU may be referred to as a processor. Furthermore, "means" in the present specification may be replaced with "circuit" or "unit."

Figure 7:
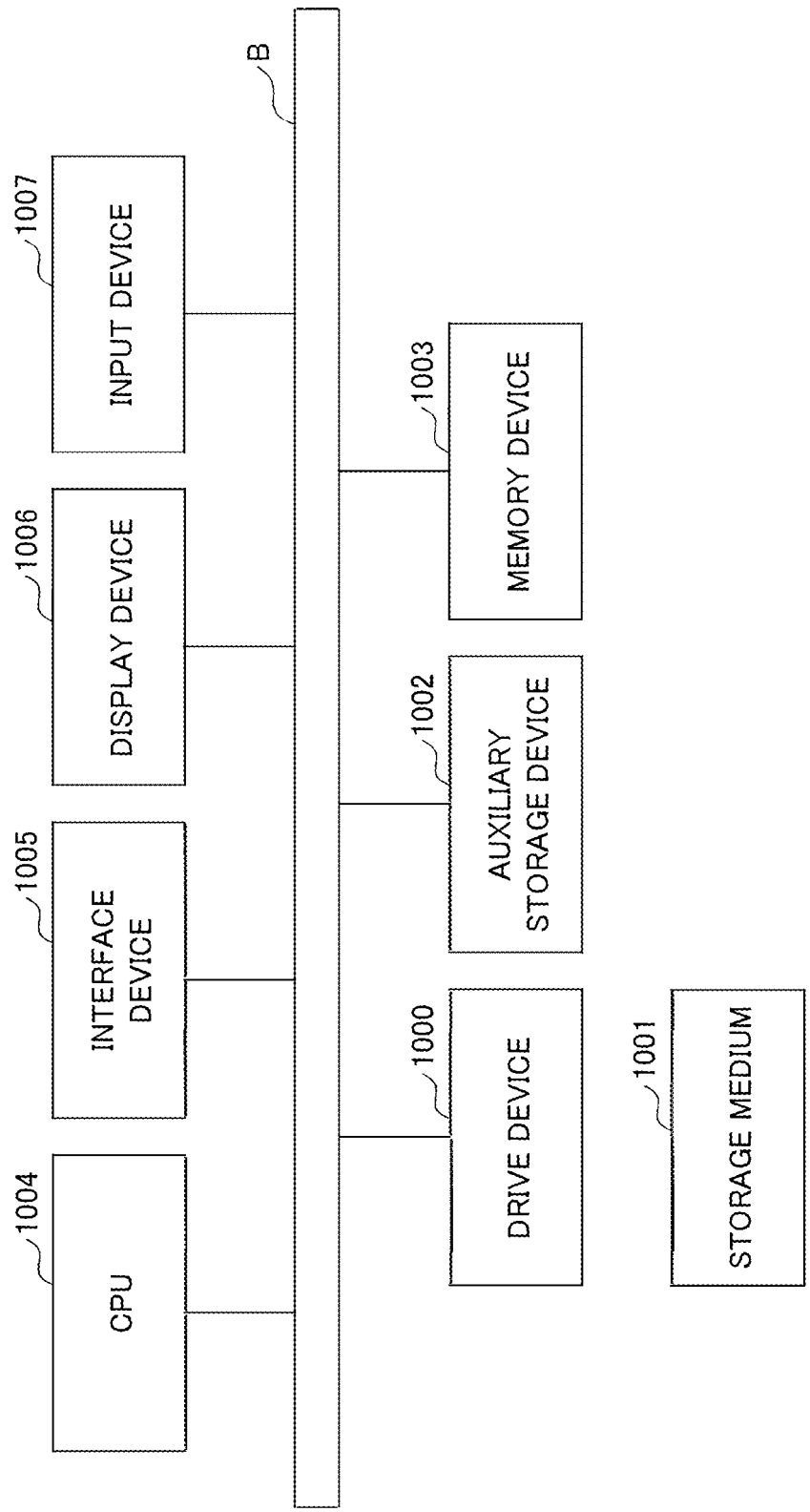
FIG. 7 is a diagram illustrating an example of a hardware configuration of a device.

FIG. 7 illustrates an example of a hardware configuration of the computer in the present embodiment. The computer of FIG. 7 includes a drive device 1000, an auxiliary storage device 1002, a memory device 1003, a CPU 1004, an interface device 1005, a display device 1006, an input device 1007, and the like, each of which is connected to one another by a bus B.

A program that realizes the process in the computer is provided by, for example, a storage medium 1001 such as a CD-ROM or a memory card. When the storage medium 1001 storing the program is set in the drive device 1000, the program is installed in the auxiliary storage device 1002 from the storage medium 1001 via the drive device 1000. However, the program does not necessarily have to be installed from the storage medium 1001 and may be downloaded from another computer via a network. The auxiliary storage device 1002 stores the installed program and also stores necessary files, data, and the like.

The memory device 1003 reads and stores therein the program from the auxiliary storage device 1002 when the program is instructed to start. The CPU 1004 realizes a function related to the device according to the program stored in the memory device 1003. The interface device 1005 is used as an interface for connecting to a network. The display device 1006 displays a GUI (Graphical User Interface) or the like according to the program. The input device 1007 includes a keyboard and mouse, buttons, a touch panel, and/or the like, and is used to input various operation instructions.

Hereinafter, Embodiment 1-1 to 1-3, Embodiment 2, Embodiment 3, and Embodiment 4 will be described in detail. Note that Steps A, B, C, D, E, and H in the sequence of each embodiment are basically the same as Steps A, B, C, D, E, and H in the process using OAuth described with reference to FIG. 1, so the explanation of these steps is simple.

Furthermore, in each embodiment, n user terminals 100 perform a similar process, so each embodiment shows a sequence for one user terminal 100. Furthermore, since a plurality of bank server 300, bank authorization server 310, and bank resource server 320 may be provided and may perform similar processes, each embodiment shows a sequence for one.

First, as Embodiment 1, Embodiment 1-1 to 1-3 will be described. In Embodiment 1, the entire transaction authentication is completed with the communication between the user and the financial service provider.

Embodiment 1-1

Figure 8:
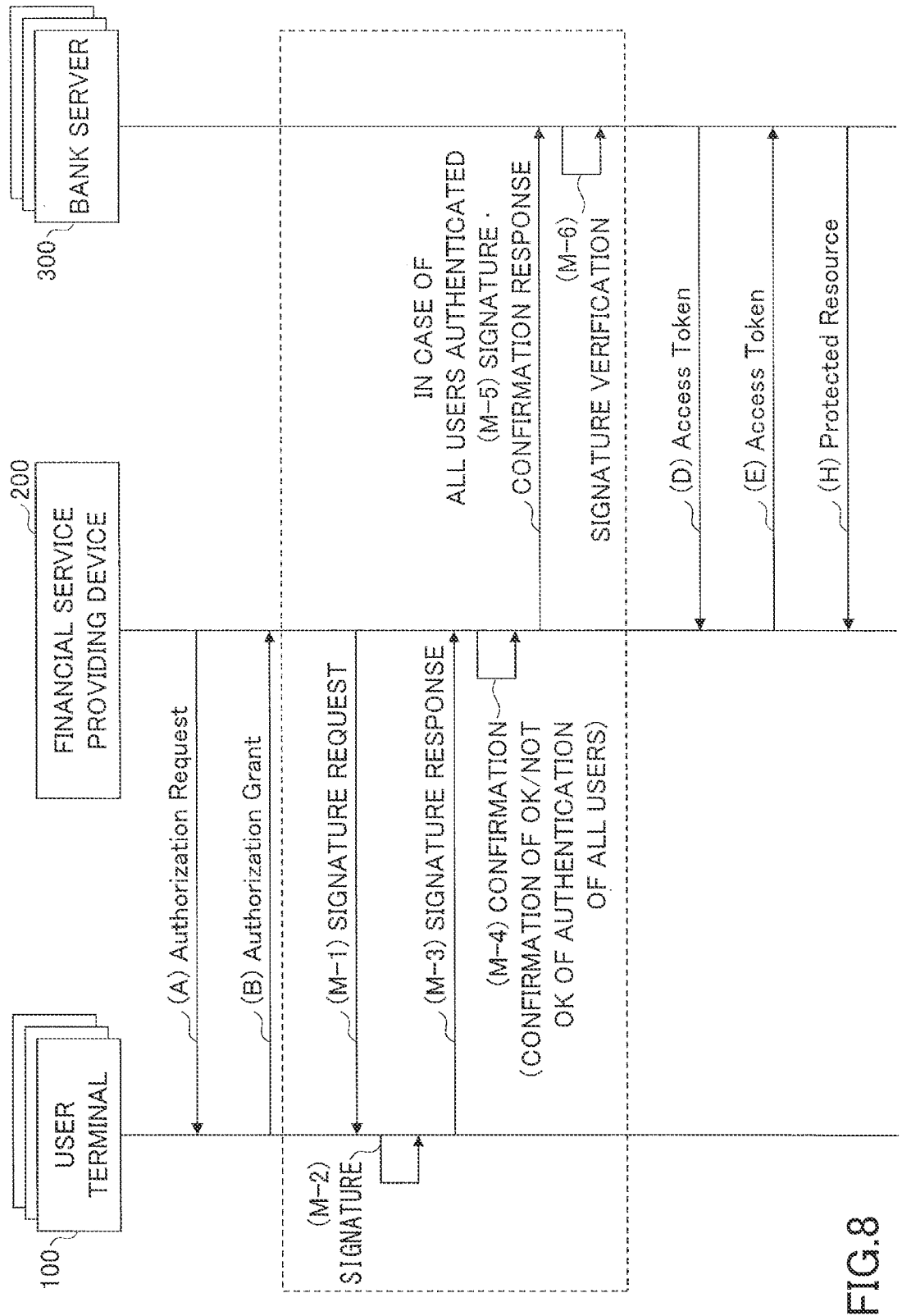
FIG. 8 is a sequence diagram according to Embodiment 1-1.

FIG. 8 is a sequence diagram according to Embodiment 1-1. Steps A and B are executed by the authorization request processing unit 110 of the user terminal 100 and the access processing unit 210 of the financial service providing device 200. After that, in Step M-1, the all-member OK/NOT OK confirming unit 220 of the financial service providing device 200 transmits Signature Request (which may be referred to as Authentication Request) to the user terminal 100. For example, Signature Request is a document (referred to as a "signature target document") requesting authentication as to whether a payment may be made from the user's account.

In Step M-2, the signature target document is displayed on the user terminal 100. Then a signature processing unit 120 of the user terminal 100 calculates the signature with an operation (e.g., a touch of a verification button) by the user who saw the document, and affixes a signature to the signature target document. The signature target document to which the signature is affixed is called a signed document.

In Step M-3, the signature processing unit 120 of the user terminal 100 transmits the signed document as Signature Response (which may be referred to as Authentication Response) to the financial service providing device 200.

In Step M-4, the all-member OK/NOT OK confirming unit 220 of the financial service providing device 200 verifies the signature of the signed document received from the user terminal 100, and if the verification is successful, the user can check that the transaction is authenticated.

Each of n user terminals 100 performs the process from Step A to Step M-3, and in Step M-4, when the all-member OK/NOT OK confirming unit 220 confirms that the authentication result for all users is OK, a signature of the financial service provider is affixed to Confirmation Response for each user. The affixing of the signature is not essential, and thus the signature may or may not be affixed. If any of the n user terminals 100 does not execute, the process up to Step M-3, the authentication results for all users will not be OK.

"Confirmation Response" is, for example, a signed document received from a user. In this case, when affixing a signature of the financial service provider, the signature is affixed to the signed document received from each user.

In Step M-5, the all-member OK/NOT OK confirming unit 220 of the financial service providing device 200 transmits Confirmation Response (user's signed document) for each user with the signature of the financial service provider to the bank server 300 of the bank used by the user.

In Step M-6, the signature processing unit 360 of the bank server 300 verifies the signature of the financial service provider. By doing so, confirmation can be made that the transaction of the user has authenticated after all the users authenticated. If the signature of the financial service provider is not attached, the bank server 300 receives Confirmation Response. By doing so, confirmation can be made that the transaction of the user has authenticated after all the users authenticated the transaction.

After that, for each user, Steps D, E, and H are executed between the access processing unit 350 of the bank server 300 and the access processing unit 210 of the financial service providing device 200.

Since the bank server 300 (bank authorization server 310 or bank resource server 320 in other embodiments) executes a predetermined process (withdrawal from the account, or the like) based on the reception of Confirmation Response, Confirmation Response may be referred to as Execution Request. The same applies to other embodiments.

Embodiment 1-2

Figure 9:
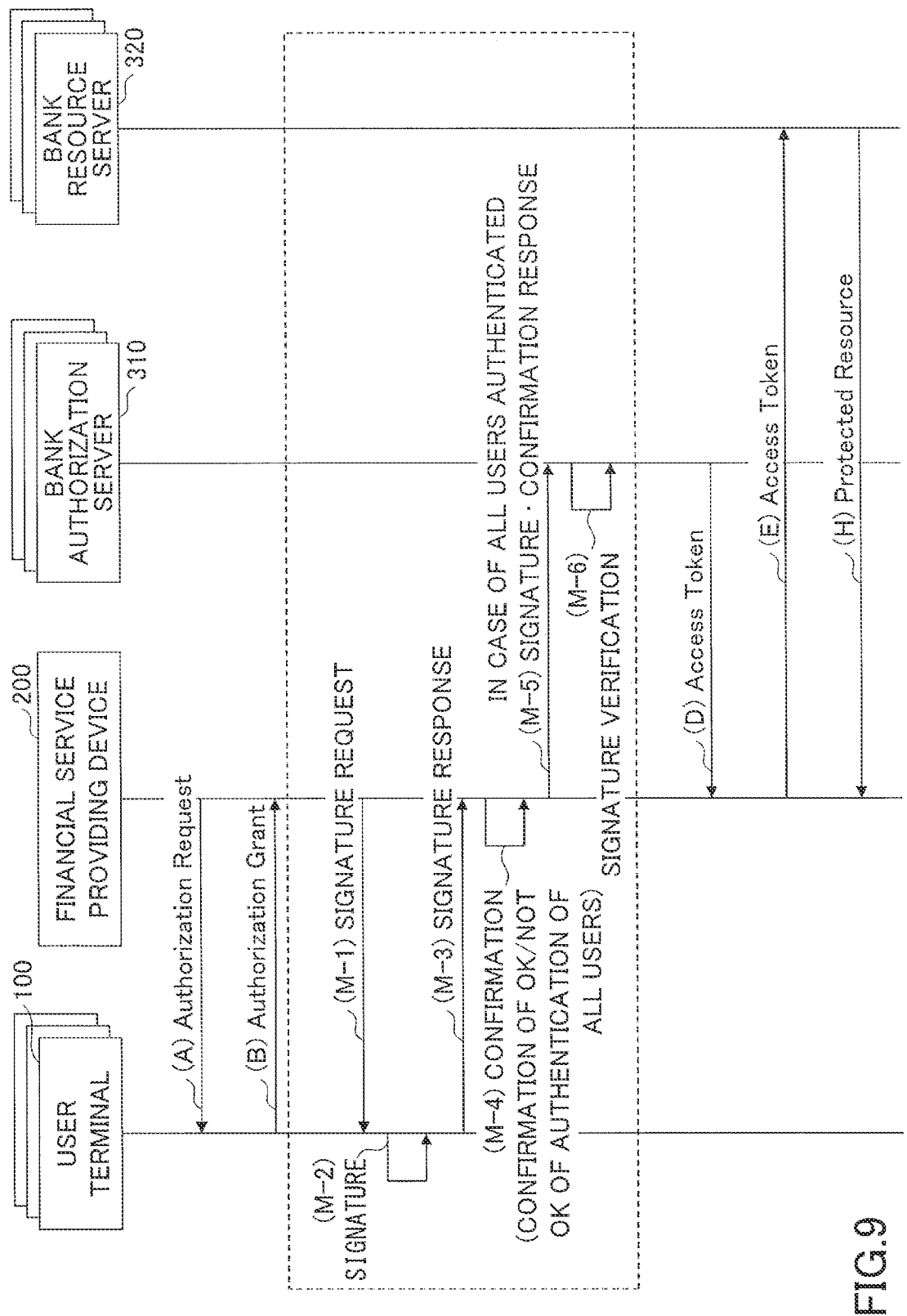
FIG. 9 is a sequence diagram according to Embodiment 1-2.

FIG. 9 is a sequence diagram according to Embodiment 1-2. Embodiment 1-2 is an example in which the bank server 300 of Embodiment 1-1 is replaced with the bank authorization server 310 and the bank resource server.

In Embodiment 1-2, Step A to Step M-4 are the same as Step A to Step M-4 of Embodiment 1-1.

In Step M-5, the all-member OK/NOT OK confirming unit 220 of the financial service providing device 200 transmits Confirmation Response (user's signed document) for each user with the signature of the financial service provider to the bank authorization server 310 of the bank used by the user.

In Step M-6, the bank authorization server 310 verifies the signature of the financial service provider. By doing so, the confirmation can be made that the transaction of the user has authenticated after all the users authenticated the transaction. If the signature of the financial service provider is not attached, the bank authorization server 310 receives Confirmation Response. By doing so, confirmation can be made that the transaction of the user has authenticated after all the users authenticated the transaction.

After that, for each user, the bank authorization server 310 transmits Access Token to the access processing unit 210 of the financial service providing device 200 in Step D, and Steps E and H are executed between the access processing unit 210 of the financial service providing device 200 and the bank resource server 320. Furthermore, for example, the bank resource server 320 executes a predetermined process.

Embodiment 1-3

Figure 10:
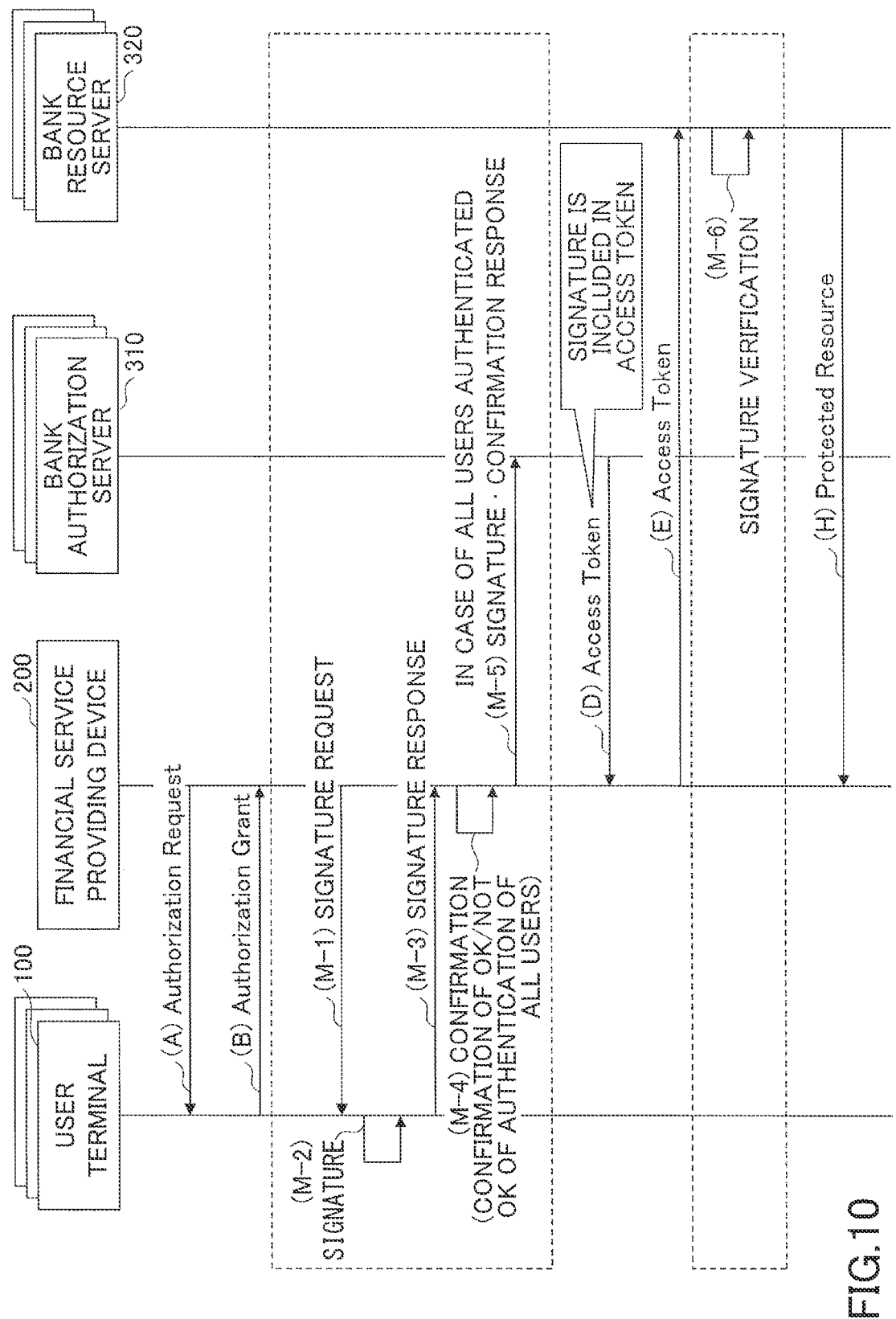
FIG. 10 is a sequence diagram according to Embodiment 1-3.

FIG. 10 is a sequence diagram according to Embodiment 1-3. Embodiment 1-3 is an example in which the bank resource server 320 executes Step M-6 (signature verification) of Embodiment 1-2.

In Embodiment 1-3, Step A to Step M-5 are the same as Step A to Step M-5 of Embodiment 1-2.

In Embodiment 1-3, Steps D, E, M-6, and H are executed after Step M-5, for each user.

In Step D, the bank authorization server 310 includes the signature of the financial service provider (alternatively, Confirmation Response with the signature attached, or just Confirmation Response in case of the signature not being attached) received in Step M-5 into Access Token and transmits Access Token including the signature to the access processing unit 210 of the financial service providing device 200. In Step E, the access processing unit 210 of the financial service providing device 200 transmits Access Token to the bank resource server 320.

In Step M-6, the bank resource server 320 verifies the signature of the financial service provider included in Access Token. By doing so, confirmation can be made that the transaction of the user has authenticated after all the users authenticated the transaction. If the signature of the financial service provider is not attached, the bank resource server 320 receives Confirmation Response included in Access Token. By doing so, confirmation can be made that the transaction of the user has authenticated after all the users authenticated the transaction.

In Step H, the bank resource server 320 transmits Protected Resource to the financial service providing device 200. Furthermore, for example, the bank resource server 320 executes a predetermined process.

Embodiment 2

Figure 11:
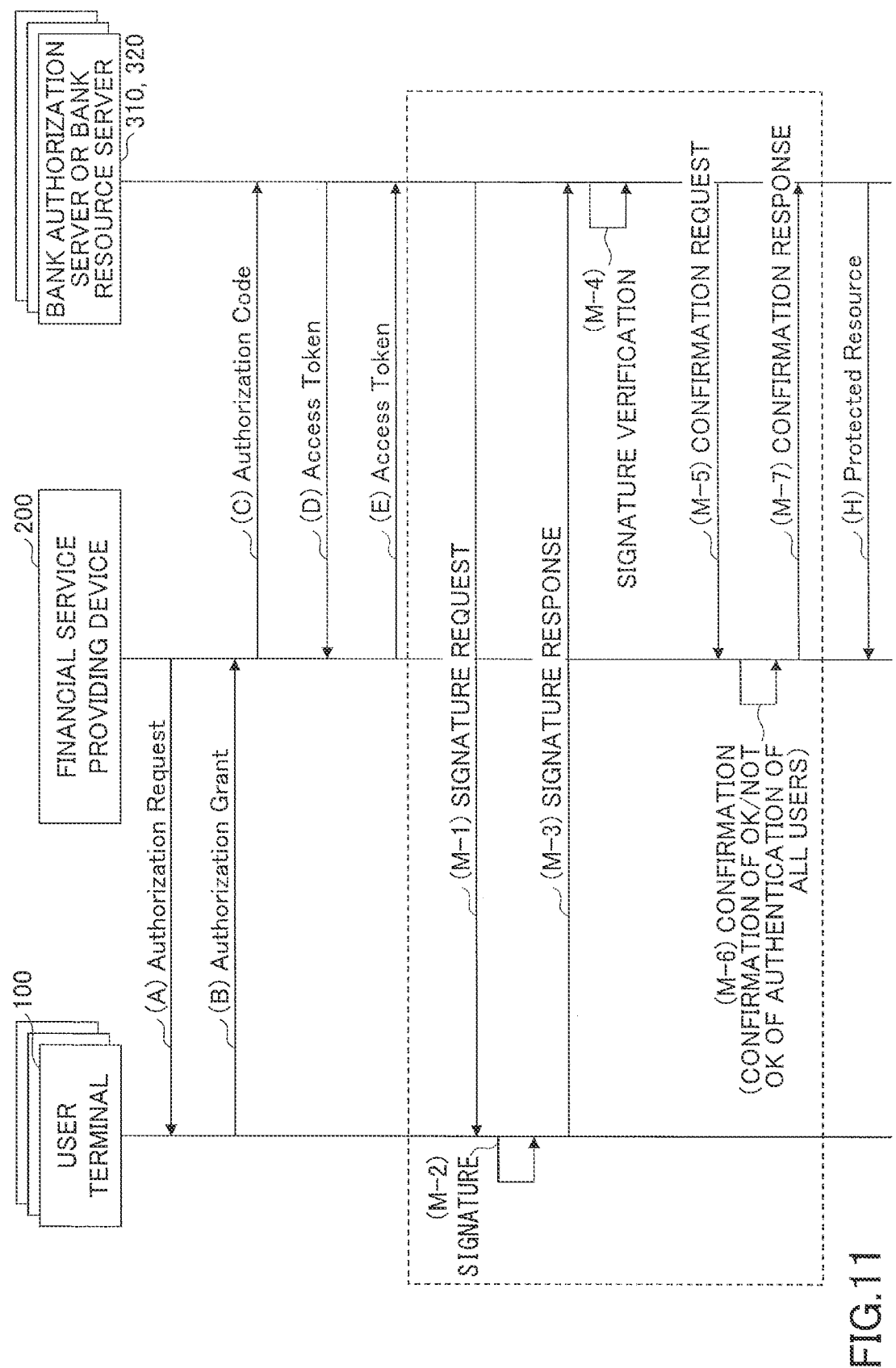
FIG. 11 is a sequence diagram according to Embodiment 2.

Next, Embodiment 2 will be described. FIG. 11 is a sequence diagram according to Embodiment 2. In Embodiment 2, "the bank authorization server 310 or the bank resource server 320" executes processes on the bank side. In other words, in Embodiment 2, each process on the bank side may be performed by either the bank authorization server 310 or the bank resource server 320. Note that in Embodiment 2, "the bank authorization server 310 or the bank resource server 320" may be replaced with the bank server 300.

As shown in FIG. 11, after Steps A and B are executed by the authorization request processing unit 110 of the user terminal 100 and the access processing unit 210 of the financial service providing device 200, Steps C, D, and E are executed between the access processing unit 210 of the financial service providing device 200 and "the bank authorization server 310 or the bank resource server 320."

In Step M-1, "the bank authorization server 310 or the bank resource server 320" transmits Signature Request to the user terminal 100. For example, Signature Request is a document (referred to as a "signature target document") requesting confirmation as to whether the payment may be made from the user's account.

In Step M-2, the signature target document is displayed on the user terminal 100. Then a signature processing unit 120 of the user terminal 100 calculates the signature with an operation (e.g., a touch of a verification button) by the user who saw the document, and affixes a signature to the signature target document. The signature target document to which a signature is affixed is called a signed document.

In Step M-3, the signature processing unit 120 of the user terminal 100 transmits the signed document as Signature Response to "the bank authorization server 310 or the bank resource server 320."

In Step M-4, "the bank authorization server 310 or the bank resource server 320" verifies the signature of the signed document, and if the verification is successful, the user can check that the transaction is authenticated. In Step M-5, Confirmation Request is transmitted to the all-member OK/NOT OK confirming unit 220 of the financial service providing device 200. Confirmation Request in Step M-5 is, for example, a signed document of a user who has succeeded in verification, but is not limited to this, and any information capable of identifying a user may be Confirmation Request.

Each of n user terminals 100 performs the process from Step A to Step M-5. Then in Step M-6, when the all-member OK/NOT OK confirming unit 220 confirms that Confirmation Request has been received for all users (that is, the authentication result is OK), Confirmation Response for each user is transmitted to "the bank authorization server 310 or the bank resource server 320" of the bank used by the user in Step M-7.

"The bank authorization server 310 or the bank resource server 320", which has received Confirmation Response for each user, executes a predetermined process for the user and transmits Protected Resource to the financial service providing device 200 in Step H.

Furthermore, in Step M-7 of Embodiment 2, the signature of the financial service provider may be transmitted with Confirmation Response, and the signature may be verified in "the bank authorization server 310 or the bank resource server 320."

Embodiment 3

Figure 12:
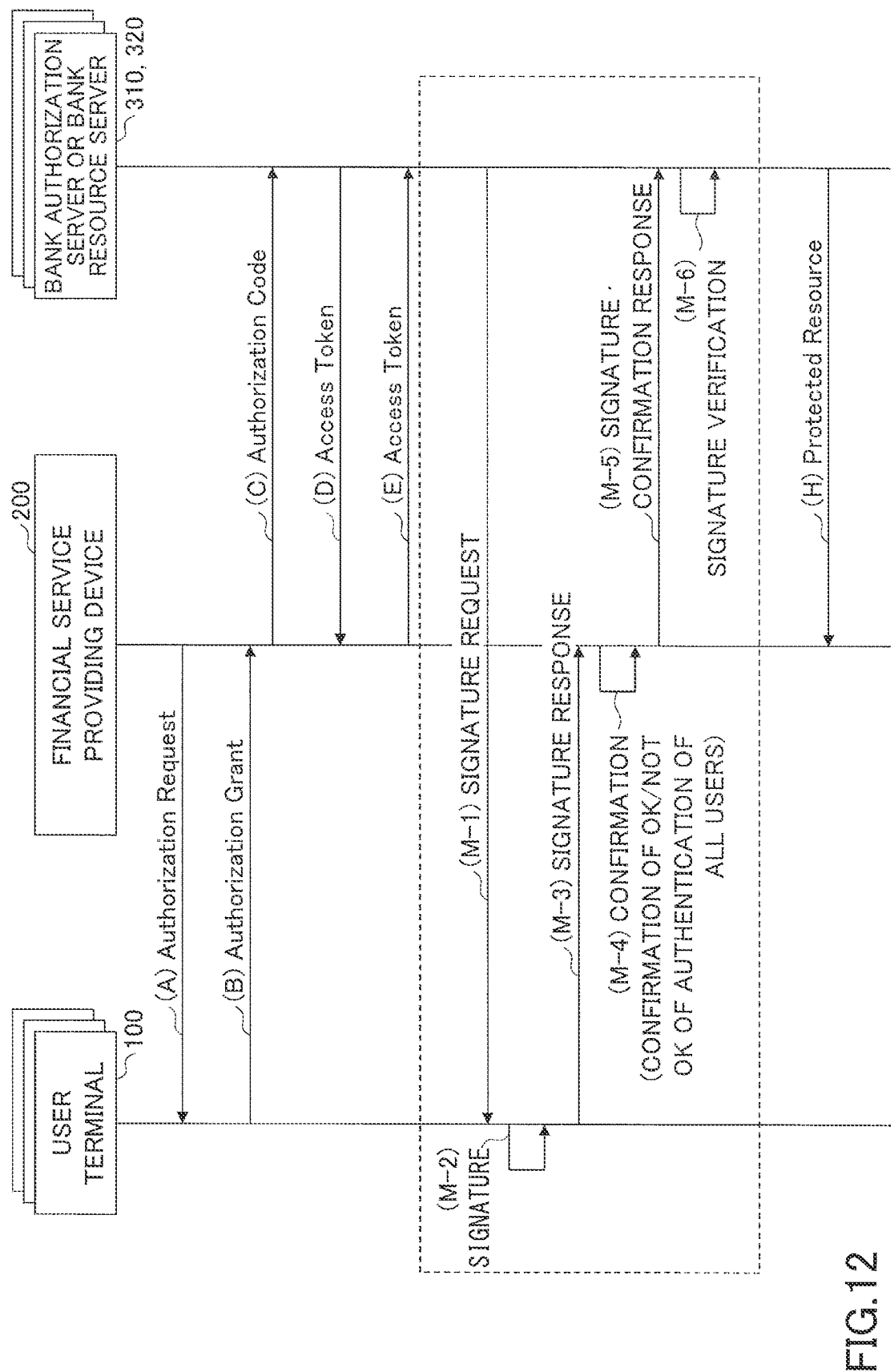
FIG. 12 is a sequence diagram according to Embodiment 3.

Next, Embodiment 3 will be described. FIG. 12 is a sequence diagram according to Embodiment 3. Similar to Embodiment 2, in Embodiment 3, "the bank authorization server 310 or the bank resource server 320" executes processes on the bank side. In other words, in Embodiment 3, each process on the bank side may be performed by either the bank authorization server 310 or the bank resource server 320. Note that in Embodiment 3, "the bank authorization server 310 or the bank resource server 320" may be replaced with the bank server 300.

As shown in FIG. 12, after Steps A and B are executed by the authorization request processing unit 110 of the user terminal 100 and the access processing unit 210 of the financial service providing device 200, Steps C, D, and E are executed between the access processing unit 210 of the financial service providing device 200 and "the bank authorization server 310 or the bank resource server 320."

In Step M-1, "the bank authorization server 310 or the bank resource server 320" transmits Signature Request to the user terminal 100. For example, Signature Request is a document (referred to as a "signature target document") requesting confirmation as to whether the payment may be made from the user's account.

In Step M-2, the signature target document is displayed on the user terminal 100. Then a signature processing unit 120 of the user terminal 100 calculates the signature with an operation (e.g., a touch of a verification button) by the user who saw the document, and affixes a signature to the signature target document. The signature target document to which a signature is affixed is called a signed document.

In Step M-3, the signature processing unit 120 of the user terminal 100 transmits the signed document as Signature Response to the financial service providing device 200.

In Step M-4, the all-member OK/NOT OK confirming unit 220 of the financial service providing device 200 verifies the signature of the signed document received from the user terminal 100, and if the verification is successful, the user can check that the transaction is authenticated.

Each of n user terminals 100 performs the process from Step A to Step M-3, and in Step M-4, when the all-member OK/NOT OK confirming unit 220 confirms that the authentication result for all users is OK, a signature of the financial service provider is affixed to Confirmation Response for each user. Furthermore, an affixing of the signature is not essential, and thus the signature may or may not be affixed. If any of the n user terminals 100 does not execute the processes up to Step M-3, the authentication results for all users will not be OK.

"Confirmation response" is a signed document received from the user. In this case, when affixing a signature of the financial service provider, the signature is affixed to the signed document received from each user.

In Step M-5, the all-member OK/NOT OK confirming unit 220 of the financial service providing device 200 transmits Confirmation Response (user's signed document) for each user with the signature of the financial service provider to the bank server 300 of the bank used by the user.

In Step M-6, "the bank authorization server 310 or the bank resource server 320" verifies the signature of the financial service provider. By doing so, confirmation can be made that the transaction of the user has authenticated after all the users authenticated. If the signature of the financial service provider is not attached, "the bank authorization server 310 or the bank resource server 320" receives Confirmation Response. By doing so, confirmation can be made that the transaction of the user has authenticated after all the users authenticated the transaction "The bank authorization server 310 or the bank resource server 320", which verified Confirmation Response for each user, executes a predetermined process for the user and transmits Protected Resource to the financial service providing device 200 in Step H.

Embodiment 4

Figure 13:
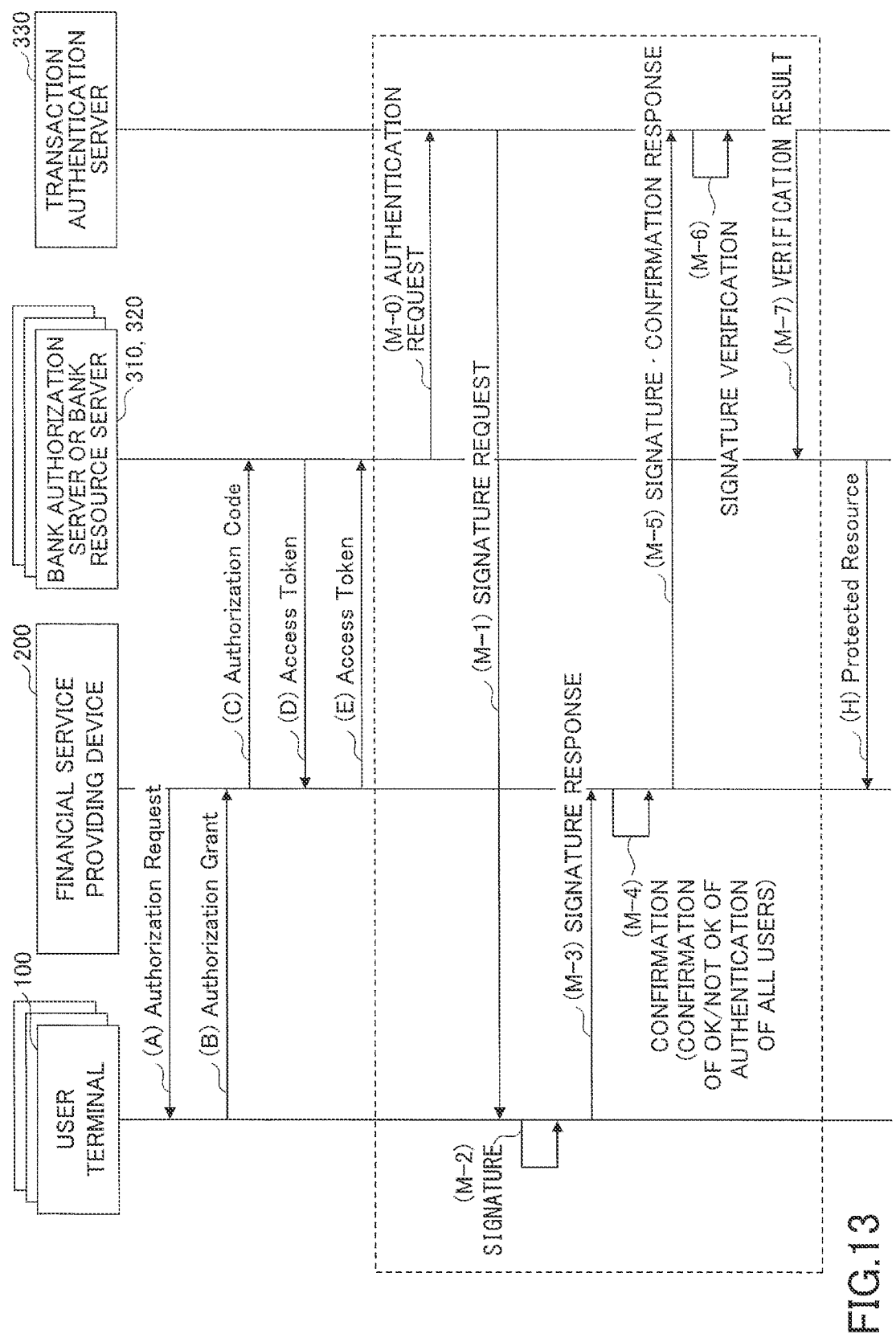
FIG. 13 is a sequence diagram according to Embodiment 4.

Next, Embodiment 4 will be described. Embodiment 4 adopts a configuration in which a function for performing transaction authentication of "the bank authorization server 310 or the bank resource server 320" in Embodiment 3 is taken out as a transaction authentication server 330 to the outside. FIG. 13 is a sequence diagram according to Embodiment 4.

As shown in FIG. 13, after Steps A and B are executed by the authorization request processing unit 110 of the user terminal 100 and the access processing unit 210 of the financial service providing device 200, Steps C, D, and E are executed between the access processing unit 210 of the financial service providing device 200 and "the bank authorization server 310 or the bank resource server 320."

In Step M-0, "the bank authorization server 310 or the bank resource server 320" transmits an authentication request to the transaction authentication server 330. In Step M-1, the transaction authentication server 330 transmits Signature Request to the user terminal 100. For example, Signature Request is a document (referred to as a "signature target document") requesting confirmation as to whether the payment may be made from the user's account.

In Step M-2, the signature target document is displayed on the user terminal 100. Then the signature processing unit 120 of the user terminal 100 calculates the signature with an operation (e.g., a touch of a verification button) by the user who saw the document, and affixes a signature to the signature target document. The signature target document to which a signature is affixed is called a signed document.

In Step M-3, the signature processing unit 120 of the user terminal 100 transmits the signed document as Signature Response to the financial service providing device 200.

In Step M-4, the all-member OK/NOT OK confirming unit 220 of the financial service providing device 200 verifies the signature of the signed document received from the user terminal 100, and if the verification is successful, the user can check that the transaction is authenticated.

Each of n user terminals 100 performs the process from Step A to Step M-3, and in Step M-4, when the all-member OK/NOT OK confirming unit 220 confirms that the authentication result for all users is OK, a signature of the financial service provider is affixed to Confirmation Response for each user. Furthermore, affixing of the signature is not essential and thus the signature may or may not be affixed. If any of the n user terminals 100 does not execute the processes up to Step M-3, the authentication results for all users will not be OK.

"Confirmation response" is a signed document received from a user. In this case, when affixing a signature of the financial service provider, the signature is affixed to the signed document received from each user.

In Step M-5, the all-member OK/NOT OK confirming unit 220 the financial service providing device 200 transmits Confirmation Response (user's signed document) for each user with the signature of the financial service provider to the transaction authentication server 330.

In Step M-6, the transaction authentication server 330 verifies the signature of the financial service provider. By doing so, confirmation can be made that the transaction of the user has authenticated after all the users authenticated. In Step M-7, the transaction authentication server 330 transmits the verification result to "the bank authorization server 310 or the bank resource server 320".

"The bank authorization server 310 or the bank resource server 320", which has received the verification result for each user, executes a predetermined process for the user and transmits Protected Resource to the financial service providing device 200 in Step H.

Effects of Embodiments, Etc.

According to the technology of the present embodiment explained in each embodiment, for a process involving a plurality of people (particularly, a large number of people), the process can be executed only when the authentication results of all the plurality of users match.

For example, a financial service provider can check whether "all members do not make transactions" or "all members do transactions" in financial services (e.g., a bill splitting service) that require a large number of people to make transactions such as payments. This allows, for example, the bank to perform transaction authentication in which all member's transactions are guaranteed.

In Embodiments 1, 3, and 4, the above-mentioned guarantees can be left in the form of a signature by signing by the financial service provider during the confirmation phase of the financial service provider.

Summary of Embodiments

The embodiments described with reference to Embodiments 1 to 4 include at least the configurations of the following items 1 to 7.

Clause 1

A service providing system providing services to a plurality of users, the service providing system comprising:
  a transmitting unit configured to transmit, to a user terminal of each user, an authentication request requesting authentication for executing a predetermined process;
  a receiving unit configured to receive, from the user terminal of each user, an authentication response affixed with a user signature; and
  an executing unit configured to execute the predetermined process with respect to each user upon successful signature verification for all the plurality of users.

Clause 2

A service providing device providing services to a plurality of users, the service providing system comprising:
  a receiving unit configured to receive an authentication response affixed with a user signature from a user terminal of each user who received an authentication request requesting authentication for executing a predetermined process; and
  a requesting unit configured to transmit an execution request to a system executing the predetermined process so that the predetermined process is executed with respect to each user upon successful signature verification for all the plurality of users.

Clause 3

A service providing device providing services to a plurality of users, the service providing device comprising:
  a receiving unit configured to receive a confirmation request for each user from a system that verified a signed document that is affixed with a signature of a user who authenticated to execute a predetermined process; and
  a requesting unit configured to transmit an execution request to a system executing the predetermined process so that the predetermined process is executed with respect to each user when the confirmation request is received with respect to all the plurality of users.

Clause 4

A service providing device according to clause 2 or 3, wherein the requesting unit affixes a signature of a service provider to the execution request, and transmits the execution request affixed with the signature to the system.

Clause 5

A method of providing service to be executed by a service providing system providing services to a plurality of users, the method of providing service comprising:
  Transmitting, to a user terminal of each user, an authentication request requesting authentication for executing a predetermined process;
  Receiving, from the user terminal of each user, an authentication response affixed with a user signature; and
  executing the predetermined process with respect to each user upon successful signature verification for all the plurality of users.

Clause 6

A program for causing a computer to function as each of the units in the service providing system according to clause 1.

Clause 7

A program for causing a computer to function as each of the units in the service providing device according to clause 2 or 3.

The present invention is not limited to such specific embodiments as was previously described, and various modifications and changes can be made within the scope of the gist of the present invention described in the claims.

This patent application claims priority based on Japan Patent Application No. 2019-003622 filed on Jan. 11, 2019, and the entire contents of Japan Patent Application No. 2019-003622 are incorporated into this patent application.

REFERENCE SIGNS LIST 100 user terminal
110 authorization request processing unit
120 signature processing unit
200 financial service providing device
210 access processing unit
220 all-member OK/NOT OK confirming unit 220
300 bank server
310 bank authorization server
320 bank resource server
330 transaction authentication server
350 access processing unit
360 signature processing unit
400 network

The invention claimed is:

1. A service providing system comprising:
a memory; and
a processor of a first server coupled to the memory and configured to execute operations comprising:
  receiving an authorization response data from a user terminal of each user of a plurality of users over a network according to an OAuth authorization protocol, wherein the authorization response data indicates granting authorization by said each user of the plurality of users authorizing access to a resourced server of a second server to perform a predetermined process, wherein the predetermined process comprises updating a value of data representing a resource of said each user of the plurality of users stored in a second server, the second server is distinct from the first server, the first server represents a client of the OAuth authorization protocol, and the second server includes a resource server and an OAuth authorization server;
  determining, based on the received authorization response data from all users of the plurality of users, authorization by the all users of the plurality of users for performing the predetermined process;
  generating, based on the determined authorization, an authentication request of said user of the plurality of users;
  transmitting, by the first server, to the user terminal of said each user of the plurality of users over the network, the authentication request requesting authentication of said each user for executing the predetermined process, wherein the transmitting the authentication request causes the user terminal of said each user of the plurality of users to generate signature data of said each user based on identity data of said each user;
  receiving, by the first server, from the user terminal of each user of the plurality of users over the network, an authentication response data affixing the user signature data of said each user of the plurality of users;
  determining, by the first server, based on verifying the affixed user signature data of said each user of the plurality of users in the authentication response data, authentication of said each user of the plurality of users;
  generating, based on the received user signature data, confirmation response data, wherein the confirmation response data comprise the user signature data of the all users of the plurality of users;
  transmitting, by the first server to the authorization server over the network, based on verifying the authentication response data associated with the all users of the plurality of users, the confirmation response data, wherein the confirmation response data includes data confirming authentication of the all users of the plurality of users and authorizing the predetermined process by the all users of the plurality of users;
  causing the authorization server to verify the confirmation response data associated with the predetermined process without performing additional access confirmation with the all users of the plurality of users;
  receiving access token data according to the OAuth authorization protocol;
  transmitting, by the first server using the access token data of the first server, a request to perform the predetermined process including updating the value of the data representing the resource based on a successful signature verification of the confirmation response data; and
  receiving from the resource server of the second server, result data of performing the predetermined process, wherein the result data indicates successful completion of the updating a value of data representing a resource of said each user of the plurality of users stored in a second server.

2. A non-transitory computer-readable recording medium storing computer-executable program instructions that when executed by a processor cause a system to execute operations according to claim 1.

3. He non-transitory computer-readable recording medium according to claim 2, wherein the resource includes an account associated with the predetermined process.

4. The service providing system according to claim 1, wherein the resource includes an account.

5. A service providing device for updating resource data, the service providing device comprising:
a memory; and
a processor coupled to the memory and configured to execute operations comprising:
  receiving an authorization response data from a user terminal of each user of a plurality of users over a network according to an OAuth authorization protocol, wherein the authorization response data indicates granting authorization by said each user of the plurality of users authorizing access to a resourced server of a second server to perform a predetermined process, wherein the predetermined process comprises updating a value of data representing a resource of said each user of the plurality of users stored in a second server, the second server is distinct from the first server, the first server represents a client of the OAuth authorization protocol, and the second server includes a resource server and an OAuth authorization server;

determining, based on the received authorization response data from the all users of the plurality of users, authorization by the all users of the plurality of users for performing the predetermined process;

generating, based on the determined authorization, an authentication request of said user of the plurality of users;

transmitting, by the service providing device, to the user terminal of said each user of the plurality of users over the network, an authentication request, the transmitting the authentication request causes the user terminal of said each user of the plurality of users to generate signature data of said each user based on identity data of said each user;

receiving, by the service providing device over the network, an authentication response data affixing a user signature data from the user terminal of said each user of the plurality of users;

determining, by the service providing device, based on verifying the affixed user signature data of said each user of the plurality of users in the authentication response data, authentication of said each user of the plurality of users;

generating, based on the received user signature data, an execution request for executing the predetermined process;

transmitting, by the service providing device to the OAuth authorization server of the second server over the network, based on receiving both the authorization grant and the authentication response data, the execution request to the resource server for executing the predetermined process so that the predetermined process is executed with respect to each user of a plurality of users upon successful signature verification for all the plurality of users as an authorized and authenticated process without performing additional access confirmation with all users of the plurality of users, wherein the successful signature verification represents a confirmation of authenticating a write access to the data representing the resource associated with each user of the plurality of users by executing the predetermined process using access token data associated with the authorization grant for updating the value of the data representing the resource associated with the plurality of users.

6. The service providing device according to claim 5, the processor further configured to execute operations comprising:

affixing a signature of a service provider to the execution request; and transmitting, by the service providing device to the server of the system over the network, the execution request with the signature, causing the system executing the predetermined process.

7. A non-transitory computer-readable recording medium storing computer-executable program instructions that when executed by a processor cause a system to execute operations according to claim 5.

8. The non-transitory computer-readable recording medium according to claim 7, wherein the resource includes an account associated with the predetermined process.

9. The service providing device according to claim 5, wherein the resource includes an account associated with the predetermined process.

10. A service providing device for updating resource data, the service providing device comprising:

a memory; and a processor coupled to the memory and configured to execute operations comprising:

receiving an authorization response data from a user terminal of each user of a plurality of users over a network according to an OAuth authorization protocol, wherein the authorization response data indicates granting authorization by said each user of the plurality of users authorizing access to a resourced server of a second server to perform a predetermined process, wherein the predetermined process comprises updating a value of data representing a resource of said each user of the plurality of users stored in a second server, the second server is distinct from the first server, the first server represents a client of the OAuth authorization protocol, and the second server includes a resource server and an OAuth authorization server;

transmitting, by the service providing device, to the user terminal of said each user of the plurality of users over the network, an authentication request, the transmitting the authentication request causes the user terminal of said each user of the plurality of users to generate signature data of said each user based on identity data of said each user;

receiving, by the service providing device over the network, a confirmation request for each user of a plurality of users from a system that verified a signed document affixing a signature of each user of the plurality of users, wherein the verified signed document represents a confirmation of a write access to data representing a resource associated with each user of the plurality of users by executing the predetermined process;

determining, by the service providing device, based on verifying the affixed user signature data of said each user of the plurality of users in the authentication response data, authentication of said each user of the plurality of users;

generating, based on the received user signature data, an execution request for executing the predetermined process;

transmitting, by the service providing device to the OAuth authorization server of the second server over the network, based on receiving both the authorization grant and an authentication response, the execution request to the resource server for executing the predetermined process so that the predetermined process is executed by the second server with respect to each user of the plurality of users as an authorized and authenticated process without performing additional access confirmation with all users of the plurality of users when the confirmation request is received with respect to all the plurality of users, wherein the confirmation request represents a confirmation of a write access to the data representing the resource associated with each user of the plurality of users by executing the predetermined process.

* * * * *